United States Patent
Anastasia et al.

[11] Patent Number: 6,098,999
[45] Date of Patent: Aug. 8, 2000

[54] SAFETY SHOPPING CART

[76] Inventors: James A. Anastasia; Katrina R. Anastasia, both of 210 Pinewalk Way, Alpharetta, Ga. 30202

[21] Appl. No.: 09/133,449

[22] Filed: Aug. 13, 1998

[51] Int. Cl.[7] .................................................. B62D 39/00
[52] U.S. Cl. ........................................ 280/33.994; 188/19
[58] Field of Search ........................ 280/33.991, 33.992, 280/33.993, 33.994, 47.34, 47.38, 79.2, 79.3; 188/19, 20, 74

[56] References Cited

U.S. PATENT DOCUMENTS

| | | | |
|---|---|---|---|
| D. 362,529 | 9/1995 | Hilaire, Jr. et al. | 280/33.994 |
| 2,997,311 | 8/1961 | Umanoff | 280/33.993 |
| 3,117,653 | 1/1964 | Altherr | 280/33.994 |
| 3,963,255 | 6/1976 | Trubiano | 280/33.993 |
| 3,993,319 | 11/1976 | Day | 280/33.992 |
| 3,999,774 | 12/1976 | Rehrig | 280/33.99 R |
| 4,324,430 | 4/1982 | Dimas, Jr. et al. | 280/33.993 |
| 4,976,447 | 12/1990 | Batson | 280/33.994 |
| 5,390,942 | 2/1995 | Schuster et al. | 280/33.994 |
| 5,865,448 | 2/1999 | Kern et al. | 280/33.991 |
| 5,918,891 | 7/1999 | Russell | 280/33.992 |
| 5,961,133 | 10/1999 | Perry | 280/33.993 |

FOREIGN PATENT DOCUMENTS

WO 94/03073  8/1984  WIPO ............................... 280/33.994

*Primary Examiner*—Richard M. Camby
*Assistant Examiner*—Gerald Klebe

[57] ABSTRACT

A shopping cart is provided including a frame and a metal support structure including a pair of vertical stanchions coupled to the frame and extending downwardly. The metal support structure further includes a bottom portion with a pair of caster wheels and a pair of rear wheels rotatably mounted thereon. A brake assembly includes a horizontal member rotatably mounted between the vertical stanchions of the support structure at a height sufficient enough to allow a plurality of the shopping carts to be stacked in tandem. A pedal is fixedly mounted to the horizontal member. Further, at least one foot has a top end fixedly mounted to the horizontal member with at least one brake pad mounted to a bottom end of the foot, wherein the brake pad engages one of the rear wheels when the pedal is depressed.

11 Claims, 2 Drawing Sheets

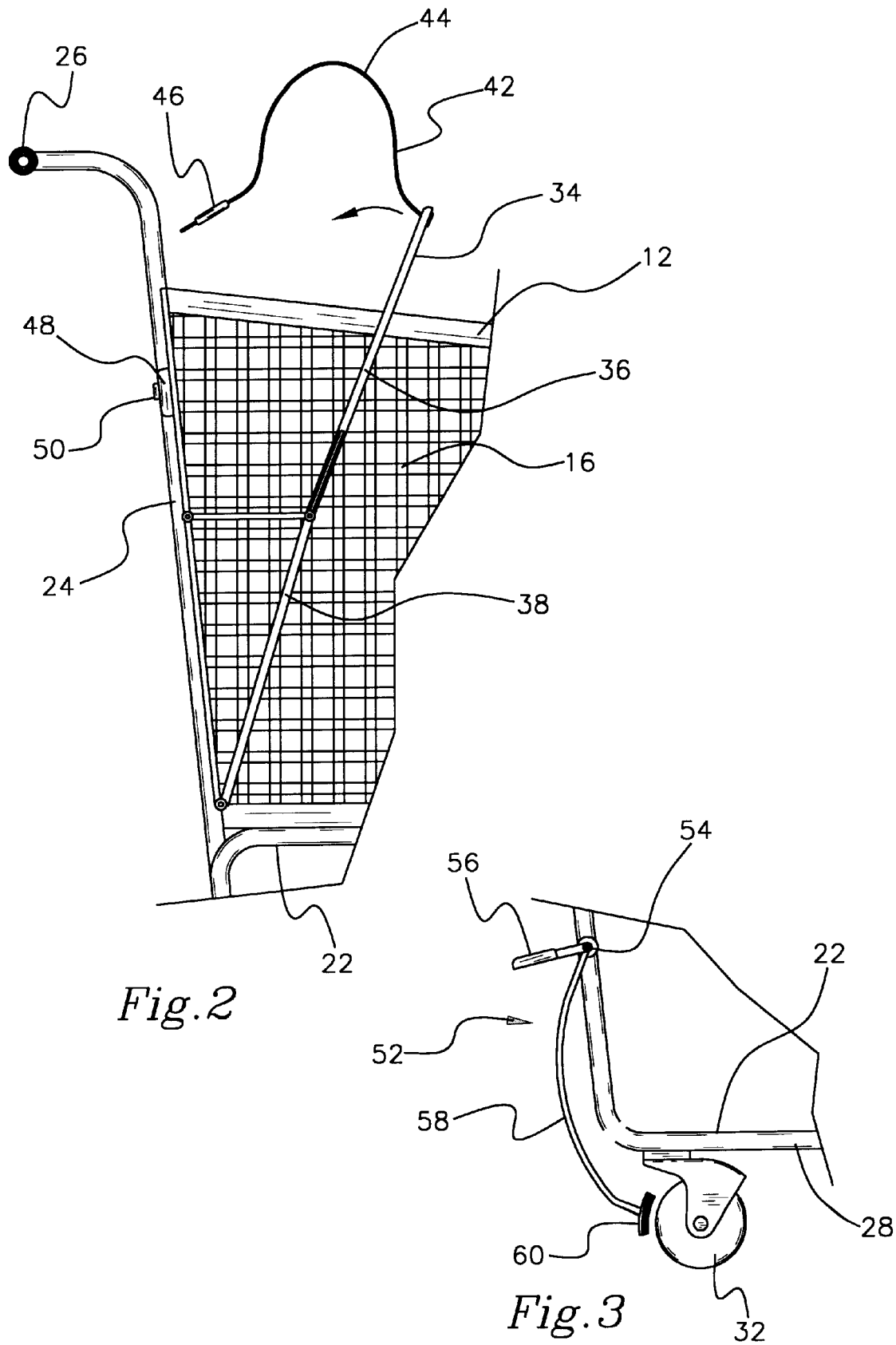

SAFETY SHOPPING CART

BACKGROUND OF THE INVENTION

1. Field of the Invention

The present invention relates to shopping carts and more particularly pertains to a new safety shopping cart for affording a cart with multiple safety features.

2. Description of the Prior Art

The use of shopping carts is known in the prior art. More specifically, shopping carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art shopping carts and the like include U.S. Pat. Nos. 5,499,697; 5,042,622; 5,641,200; U.S. Pat. No. Des. 198,448; U.S. Pat. Nos. 5,472,235; and 2,662,775.

In these respects, the safety shopping cart according to the present invention substantially departs from the conventional concepts and designs of the prior art, and in so doing provides an apparatus primarily developed for the purpose of affording a cart with multiple safety features.

SUMMARY OF THE INVENTION

In view of the foregoing disadvantages inherent in the known types of shopping carts now present in the prior art, the present invention provides a new safety shopping cart construction wherein the same can be utilized for affording a cart with multiple safety features.

The general purpose of the present invention, which will be described subsequently in greater detail, is to provide a new safety shopping cart apparatus and method which has many of the advantages of the shopping carts mentioned heretofore and many novel features that result in a new safety shopping cart which is not anticipated, rendered obvious, suggested, or even implied by any of the prior art shopping carts, either alone or in any combination thereof.

To attain this, the present invention generally comprises a frame constructed from a fluorescent plastic material. As shown in FIG. 1, the frame includes a bottom face with a peripheral side wall coupled to a periphery of the bottom face and extended upwardly therefrom for defining an interior space and an open top. For affording a more lightweight car, the bottom face and side wall of the frame preferably have a grid of cut outs formed throughout a surface thereof. For reasons that will soon become apparent, a rear face of the peripheral side wall includes a solid upper portion with a pair of large laterally spaced square cut outs formed therein. Next provided is a metal support structure including a pair of vertical stanchions coupled along side edges of the rear face of the frame. A handle is coupled to top ends of the vertical stanchions. The metal support structure further includes a bottom portion with a pair of side bars coupled to bottom ends of the vertical stanchions. Such side bars extend forwardly with a front bar mounted between front ends thereof, as shown in FIG. 1. Pivotally mounted to the front ends of the side bars is a pair of caster wheels. Associated therewith is a pair of rear wheels rotatably coupled to bottom ends of the vertical stanchions of the metal support structure about a fixed common axis. FIGS. 1 & 2 illustrate a seat including a back with a planar rectangular configuration. The seat back is equipped with a pair of linear members coupled along side edges thereof. Such linear members have bottom ends pivotally coupled to opposite ends of a bottom edge of the rear face of the frame. The seat further includes a bottom with a planar rectangular configuration. An inboard edge of the seat bottom is pivotally coupled to a lower edge of the solid upper portion of the rear face of the frame. Further, an outboard edge of the seat bottom is pivotally and slidably coupled to the linear members of the back of the seat. By this structure, the back is pivotable between a collapsed orientation with the bottom vertically oriented and an employed orientation with the bottom horizontally oriented. As shown in FIG. 1, a safety harness is provided including a pair of flexible straps having first ends coupled to opposite ends of a top edge of the back of the seat. Second ends of the straps are coupled together with a buckle mounted thereon. The safety harness further includes a safety release mounted to a central extent of an outer surface of the solid upper portion of the frame. The safety release is equipped with a slot for releasably receiving the buckle. Further, a push button is included for selectively releasing the buckle upon the depression thereof. Finally, a brake assembly is provided including a horizontal member rotatably mounted between the vertical stanchions of the support structure adjacent to the bottom edge of the rear face of the frame. A planar pedal is fixedly mounted to a central extent of the horizontal member, as shown in FIGS. 1 & 3. The brake assembly further has a pair of feet with top ends fixedly mounted to opposite ends of the horizontal member and depending therefrom. A pair of arcuate brake pads are each mounted to a bottom end of one of the feet. In use, the brake pads engage the rear wheels when the pedal is depressed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new safety shopping cart apparatus and method which has many of the advantages of the shopping carts mentioned heretofore and many novel features that result in a new safety shopping cart which is not anticipated, rendered obvious, suggested, or even implied by any of the prior art shopping carts, either alone or in any combination thereof.

It is another object of the present invention to provide a new safety shopping cart which may be easily and efficiently manufactured and marketed.

It is a further object of the present invention to provide a new safety shopping cart which is of a durable and reliable construction.

An even further object of the present invention is to provide a new safety shopping cart which is susceptible of a low cost of manufacture with regard to both materials and labor, and which accordingly is then susceptible of low prices of sale to the consuming public, thereby making such safety shopping cart economically available to the buying public.

Still yet another object of the present invention is to provide a new safety shopping cart which provides in the apparatuses and methods of the prior art some of the advantages thereof, while simultaneously overcoming some of the disadvantages normally associated therewith.

Still another object of the present invention is to provide a new safety shopping cart for affording a cart with multiple safety features.

Even still another object of the present invention is to provide a new safety shopping cart that includes a frame and a metal support structure having a pair of vertical stanchions coupled to the frame and extending downwardly therefrom. The metal support structure further includes a bottom portion with a pair of caster wheels and a pair of rear wheels rotatably mounted thereon. A brake assembly includes a horizontal member rotatably mounted between the vertical stanchions of the support structure at a height sufficient enough to allow a plurality of the shopping carts to be stacked in tandem. A pedal is fixedly mounted to the horizontal member. Further, at least one foot has a top end fixedly mounted to the horizontal member with at least one brake pad mounted to a bottom end of the foot, wherein the brake pad engages one of the rear wheels when the pedal is depressed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the seat harness of the present invention.

FIG. 3 is a side view of the brake assembly of the present invention.

DESCRIPTION OF THE PREFERRED EMBODIMENT

Figure 1:
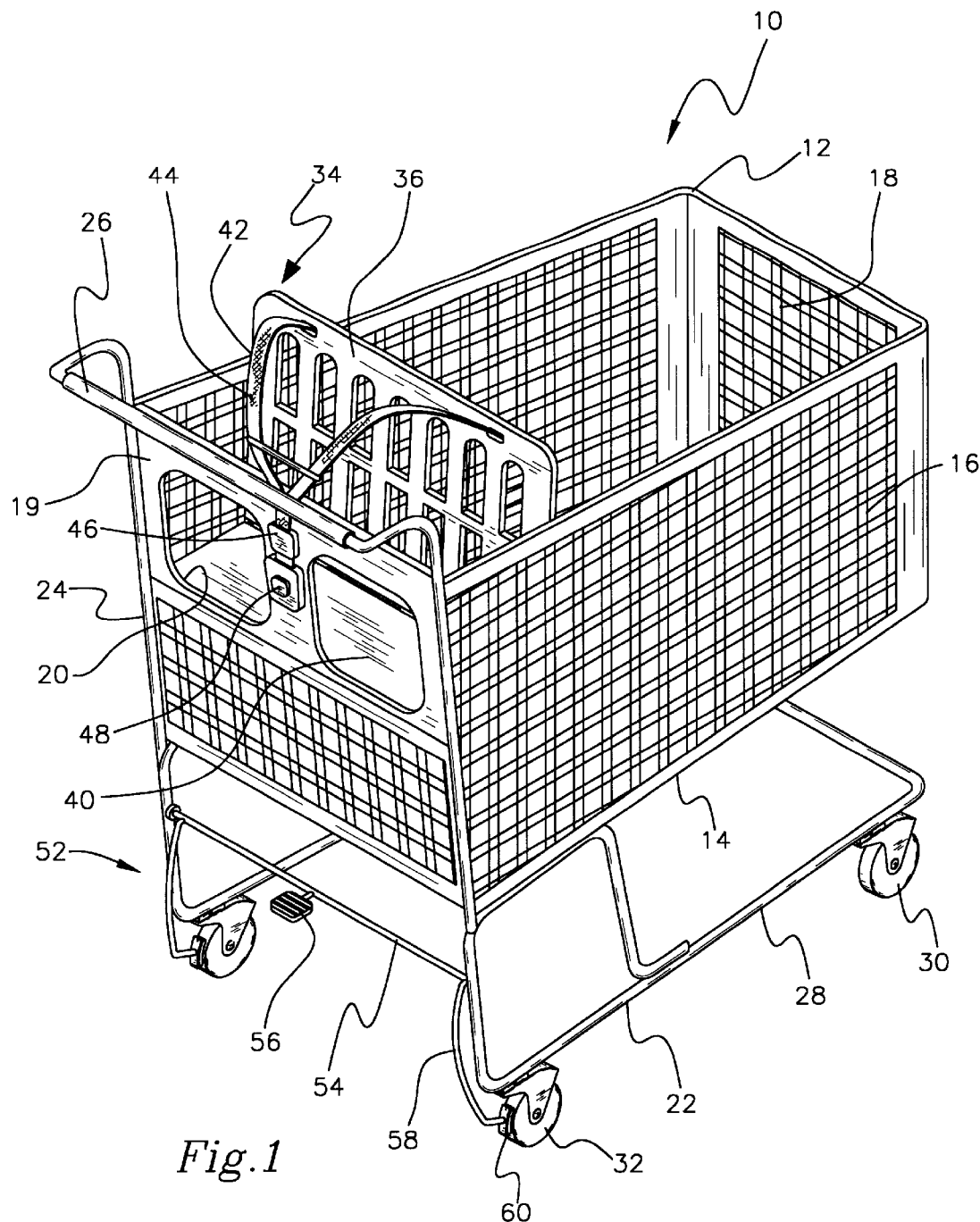
FIG. 1 is a perspective view of a new safety shopping cart according to the present invention.

With reference now to the drawings, and in particular to FIGS 1 through 3 thereof, a new safety shopping cart embodying the principles and concepts of the present invention and generally designated by the reference numeral 10 will be described.

The present invention, designated as numeral 10, includes a frame 12 constructed from a fluorescent plastic material. As shown in FIG. 1, the frame includes a bottom face 14 with a peripheral side wall 16 coupled to a periphery of the bottom face and extended upwardly therefrom for defining an interior space and an open top. For affording a more lightweight car, the bottom face and side wall of the frame preferably have a grid of cut outs 18 formed throughout a surface thereof. For reasons that will soon become apparent, a rear face of the peripheral side wall includes a solid rectangular upper portion 19 with a pair of large laterally spaced square cut outs 20 formed therein. The cut outs together preferably have a width which is about 90% a width of the frame.

Next provided is a metal support structure 22 including a pair of vertical stanchions 24 coupled along side edges of the rear face of the frame. A handle 26 is coupled between top ends of the vertical stanchions. The metal support structure further includes a bottom portion 28 with a pair of side bars coupled to bottom ends of the vertical stanchions. Such side bars extend forwardly with a front bar mounted between front ends thereof, as shown in FIG. 1.

Pivotally mounted to the front ends of the side bars is a pair of caster wheels 30. Associated therewith is a pair of rubber rear wheels 32 rotatably coupled to bottom ends of the vertical stanchions of the metal support structure about a fixed common axis.

FIGS. 1 & 2 illustrate a seat 34 including a back 36 with a planar rectangular configuration. The seat back is equipped with a pair of linear members 38 coupled along side edges thereof. Such linear members have bottom ends pivotally coupled to opposite ends of a bottom edge of the rear face of the frame. The seat further includes a bottom 40 with a planar rectangular configuration. An inboard edge of the seat bottom is pivotally coupled to a lower edge of the solid upper portion of the rear face of the frame. Further, an outboard edge of the seat bottom is pivotally and slidably coupled to the linear members of the back of the seat. This is preferably accomplished by way of a pair of tabs extending from the seat bottom that slidably engage slots formed in the linear members, as shown in FIG. 2. By this structure, the back is pivotable between a collapsed orientation with the bottom vertically oriented and an employed orientation with the bottom horizontally oriented. As an option, an auxiliary seat may be provided.

As shown in FIG. 1, a safety harness 42 is provided including a pair of flexible nylon straps 44 having first ends coupled to opposite ends of a top edge of the back of the seat. Second ends of the straps are coupled together with a buckle 46 mounted thereon. The safety harness further includes a safety release 48 mounted to a central extent of an outer surface of the solid upper portion of the frame. The safety release is equipped with a slot for releasably receiving the buckle to afford a pair of shoulder straps. Further, a push button 50 is included for selectively releasing the buckle from the slot upon the depression thereof.

Finally, a brake assembly 52 is provided including a horizontal member 54 rotatably mounted between the vertical stanchions of the support structure adjacent to the bottom edge of the rear face of the frame. A planar pedal 56 is fixedly mounted to a central extent of the horizontal member, as shown in FIGS. 1 & 3. The brake assembly further has a pair of feet 58 with top ends fixedly mounted to opposite ends of the horizontal member and depending downwardly therefrom. The feet are preferably arcuate in form. A pair of arcuate brake pads 60 are each mounted to a bottom end of one of the feet. In use, the brake pads engage the rear wheels when the pedal is depressed. As an option, a locking mechanism may be included for maintaining the pedal in an engaged orientation until the pedal is pulled upwardly. This may be accomplished by way of a frictional engagement between an extension of one of the arms and an adjacent vertical stanchion of the metal structure, or by any other desire method.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A shopping cart comprising:

a frame constructed from a fluorescent plastic material and including a bottom face with a peripheral side wall coupled to a periphery of the bottom face and extending upwardly therefrom for defining an interior space and an open top, the bottom face and side wall having a grid of cut outs formed throughout a surface thereof, a rear face of the peripheral side wall including a solid upper portion with a pair of large laterally spaced square cut outs formed therein;

a metal support structure including a pair of vertical stanchions coupled along side edges of the rear face of the frame with a handle coupled to top ends of the vertical stanchions and with bottom ends that extend downwardly, the metal support structure further including a bottom portion with a pair of side bars coupled to the bottom ends of the vertical stanchions and extending forwardly therefrom with a front bar mounted between front ends thereof;

a pair of caster wheels pivotally mounted to the front ends of the side bars;

a pair of rear wheels rotatably coupled to bottom ends of the vertical stanchions of the metal support structure about a fixed common axis;

a seat including a back with a planar rectangular configuration and a pair of linear members coupled along side edges thereof, the linear members having bottom ends pivotally coupled to opposite ends of a bottom edge of the rear face of the frame, the seat further including a bottom with a planar rectangular configuration having an inboard edge pivotally coupled to a lower edge of the solid upper portion of the rear face of the frame and an outboard edge pivotally and slidably coupled to the linear members of the back of the seat, whereby the back is pivotable between a collapsed orientation with the bottom vertically oriented and an employed orientation with the bottom horizontally oriented;

a safety harness including a pair of flexible straps having first ends coupled to opposite ends of a top edge of the back of the seat and second ends coupled together with a buckle mounted thereon, the safety harness further including a safety release mounted to a central extent of an outer surface of the solid upper portion of the frame with a slot for releasably receiving the buckle and a push button for selectively releasing the buckle upon the depression thereof; and a brake assembly including a horizontal member rotatably mounted between the vertical stanchions of the support structure at a location spaced above the rear wheels and adjacent to the bottom edge of the rear face of the frame such that the horizontal member does not block nesting of a bottom portion of another frame with the bottom portion of the frame, a planar pedal fixedly mounted on a lever arm extending radially outward from the horizontal member, the lever arm being coupled to a central extent of the horizontal member, a pair of feet having top ends fixedly mounted to opposite ends of the horizontal member and depending therefrom, and a pair of arcuate brake pads each mount ed to a bottom end of one of the feet, wherein the brake pads engage the rear wheels when the pedal is depressed.

2. The shopping cart of claim 1 wherein the pedal has a length and a width, the lever arm having a length, the length of the lever arm being substantially equal to the width of the pedal to enhance the torque applied to the horizontal member.

3. The shopping cart of claim 1 wherein the rear wheels each have a height, and wherein the horizontal member is spaced above the rear wheel approximately two and one half times the height of the rear wheels for facilitating nesting of frames of adjacent carts.

4. A shopping cart comprising:

a frame;

a metal support structure including a pair of vertical stanchions coupled to the frame and extending downwardly, the metal support structure further including a bottom portion;

a pair of caster wheels pivotally mounted to the bottom portion of the metal support structure;

a pair of rear wheels rotatably coupled to bottom ends of the vertical stanchions of the metal support structure about a fixed common axis; and a brake assembly including a horizontal member rotatably mounted between the vertical stanchions of the support structure at a height spaced above the rear wheels and adjacent to the bottom edge of the rear face of the frame such that the horizontal member does not block nesting of a bottom portion of another frame with the bottom portion of the frame, a pedal fixedly mounted to the horizontal member, at least one foot having a top end fixedly mounted to the horizontal member and depending therefrom, and at least one brake pad mounted to a bottom end of the foot, wherein the brake pad engages one of the rear wheels when the pedal is depressed.

5. The shopping cart as set forth in claim 4 wherein the pedal is mounted on a lever arm extending radially outward from the horizontal member, the lever arm being coupled to a central extent of the horizontal member.

6. The shopping cart of claim 5 wherein the pedal has a length and a width, the lever arm having a length, the length of the lever arm being substantially equal to the width of the pedal to enhance the torque applied to the horizontal member.

7. The shopping cart of claim 4 wherein the rear wheels each have a height, and wherein the horizontal member is spaced above the rear wheel approximately two and one half times the height of the rear wheels for facilitating nesting of frames of adjacent carts.

8. The shopping cart as set forth in claim 4 wherein a pair of feet depend from the horizontal bar.

9. The shopping cart as set forth in claim 4 and further including a collapsible seat with a back and a bottom, wherein further provided is a safety harness including a pair of flexible straps having first ends coupled to opposite ends of a top edge of the back of the seat and second ends coupled together with a fastener mounted thereon for coupling with the cart.

10. The shopping cart as set forth in claim 9 wherein the fastener includes a buckle and further included is a safety release mounted to a central extent of an outer surface of the rear face of the frame for convenient access by a person in a position to push the cart, the safety release being situated between a pair of cut outs for receiving the legs of a child placed in the seat, the safety release adapted for releasably receiving the buckle and including a push button for selectively releasing the buckle upon the depression thereof.

11. The shopping cart as set forth in claim 4 wherein the frame is constructed from a fluorescent material.

* * * * *